United States Patent Office 3,104,727
Patented Sept. 24, 1963

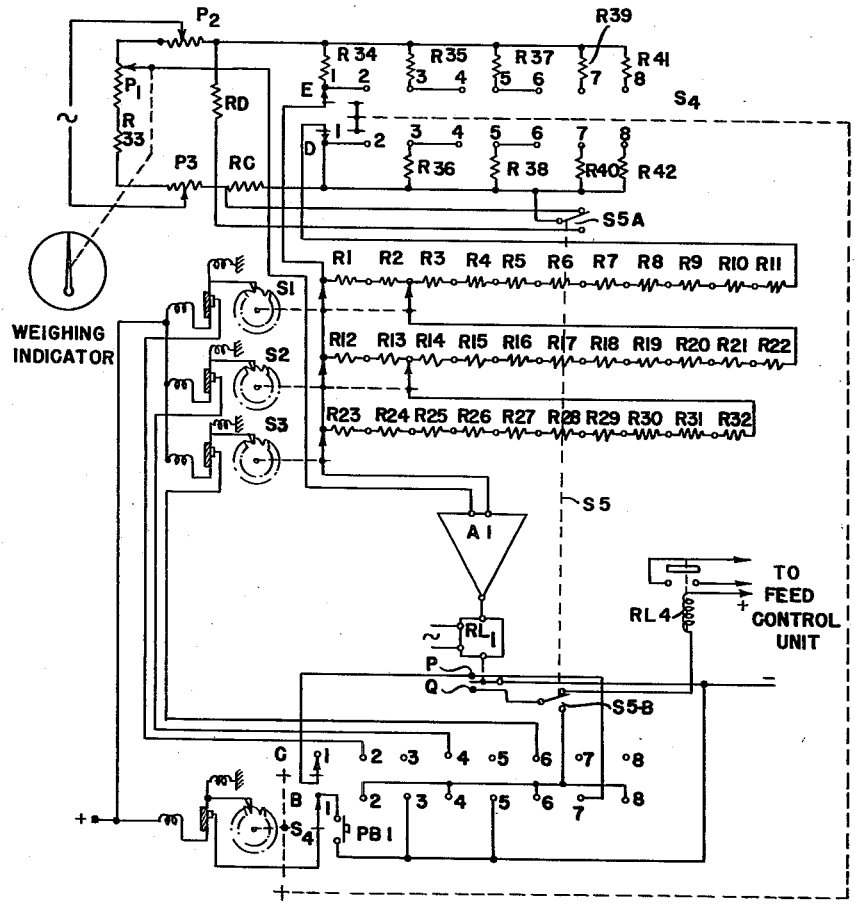
INVENTOR
JOHN M. CHILTON

3,104,727
SELF-BALANCING POTENTIOMETER SYSTEMS FOR USE IN ASSOCIATION WITH WEIGHING APPARATUS
John Moorhouse Chilton, Edgbaston, Birmingham, England, assignor to W. & T. Avery Limited, Birmingham, England, a British company
Filed Nov. 10, 1958, Ser. No. 772,772
Claims priority, application Great Britain Nov. 15, 1957
3 Claims. (Cl. 177—70)

This invention has reference to improvements connected with self-balancing potentionmeter systems for use in association with weighing apparatus.

In the specification of patent application Serial No. 697,926, now Patent No. 3,030,569, I have disclosed and claimed in association with weighing means, a self-balancing potentiometer system for providing a digital representation corresponding to the magnitude of a weightment, comprising variable impedance means controlled by the weighing means, said variable impedance means being incorporated in a bridge circuit embodying a multi-stage potentiometer, a phase-conscious circuit which is responsive to a signal derived from an unbalanced condition of the bridge circuit, contact means controlled by the phase conscious circuit and thus responsive to a phase reversal of the signal derived from the bridge circuit when the multi-stage potentiometer is adjusted through its bridge balancing setting, and stepping relay means under the control of the said contact means for effecting an automatic setting of the stages of said potentiometer to balance the bridge circuit to accord with the magnitude of the weighment.

The present invention consists of the provision in a self-balancing potentiometer system as hereinbefore specified of means for increasing the voltage which is applied in the bridge circuit across the multi-stage potentiometer in a second weighing operation by a predetermined proportion relative to the voltage applied during a first weighing operation, and a circuit including feed mechanism under the control of the contacts associated with the phase conscious circuit for controlling the addition of the second weighment to the first weighment in said predetermined proportion.

Means for carrying the present invention into practice will now be described with reference to the accompanying circuit diagram.

Referring to the circuit seen in FIGURE 1 the spindle carrying the indicator of the weighing apparatus is mechanically coupled to the moving contact of a precision potentiometer P1 included in a Wheatstone bridge also comprising the potentiometers P2, P3 and a Kelvin-Varley type multi-stage potentiometer R1—R32. The bridge circuit also includes the resistances R33 and R34—R42 the purpose whereof will be hereinafter described. The moving contacts of the potentiometers P2 and P3 are connected to an A.C. supply and are adjusted so that the bridge circuit is balanced with the weight indicator registering ½ division and the Kelvin-Varley potentiometer set at zero, and also with the weight indicator at its maximum reading say 998½ units and the Kelvin-Varley potentiometer adjusted to 998 divisions, the half division discrepancy being used so that the Kelvin-Varley potentiometer indicates the nearest division of the weight indicator.

The Kelvin-Varley potentiometer in the example illustrated consists of three decade stages wherein the pair of moving contacts in each decade are driven by a stepping relay S1, S2 and S3 which are adapted to traverse their respective moving contacts so long as their driving coils are energized from the current supply. The output voltage derived from between the moving contact of the potentiometer P1 and the Kelvin-Varley potentiometer network is fed to a phase-conscious amplifier ciricuit A1 which controls a relay RL1 such that a phase reversal of the input signal to the said circuit results in the actuation of the relay. The relay RL1 incorporates a moving contact which is co-operative with a pair of alternative fixed contacts P and Q. It will be appreciated that as the Kelvin-Varley potentiometer is adjusted from its under-balancing condition to its over-balancing condition the output of the phase-conscious stage will suffer a 180 degree phase reversal which results in the actuation of the relay RL1 so that its moving contact is operated to engage the alternative contact P or Q.

The operation of the stepping relays S1, S2 and S3 is controlled by a further stepping relay S4 incorporating four banks of contacts B, C, D and E and adapted to traverse a moving contact associated with each bank so long as the driving coil of the switch is energized from the current supply. The moving contact of the bank B is connected through the energizing coil of the relay S4 to the positive terminal of a D.C. power supply the negative terminal whereof is connected both to the moving contact of the relay RL1 and to the 1st, 3rd and 5th contacts of the contact bank B. The moving contact of the bank C is connected to one of the fixed contacts (P) of the relay RL1, the alternative fixed relay contact (Q) being connected to the 2nd, 4th, 6th and 8th contacts of the bank B. The 2nd, 4th and 6th contacts of the bank C are connected to the energizing coils of the stepping relays S1, S2 and S3 respectively. It will be appreciated that when the operation of the governing stepping relay S4 is initiated, by means of for example a push button switch PB1 in the connection of the power supply to the first terminal of the bank B, then the moving contact B moves to the 2nd contact of this bank; simultaneously the moving contact of the bank C is traversed to the 2nd contact of its bank and assuming that the contact P of the relay RL1 is engaged, the stepping relay S1 is thereby energized so that its associated pair of stepping contacts of the hundreds decade R1—R11 of the Kelvin-Varley potentiometer are traversed until the bridge circuit passes through and past its balanced condition whereby the output of the phase-conscious stage is reversed in phase, thus to result in the engagement of the alternative contacts Q of the relay RL1.

Since it is necessary that the Kelvin-Varley potentiometer be adjusted to its over-balanced condition in order that a phase reversal may be obtained to effect the operation of the contacts P and Q it will be appreciated that the Kelvin-Varley potentiometer must be subsequently reset to its under-balanced condition in order that a balance position may obtain in the lower decades. If for example the potentiometer P1 is set to say 560 units corresponding to the indication of the weighing indicator then the first decade of the Kelvin-Varley potentiometer must be first set to 600 units i.e. over-balanced to result in the operation of the relay RL1 and must then be reset to 500 units to admit of the second decade being set at 560. This operation of the circuit is achieved by means of the resistances R34—R38 which are connected as shown to the contacts of the third and fourth banks D and E of the stepping relay S4. The resistance R34 is equal to one unit increment in the highest order balancing stage S1 of the Kelvin-Varley potentiometer, which in the case of a three decade system will equal 100 units. The resistance R34 is arranged to be connected by the governing stepping switch S4 between the low end of the scale potentiometer P1 and through the first and second contacts of the contact bank E to the low end of the Kelvin-Varley network so that the balance point in the Kelvin-Varley network is effectively biased by 100 units with the result that in the above example, when the Kelvin-Varley potentiometer is set at 500 units then the Kelvin-Varley potentiometer together with the resistance R34 produces 600 units of voltage thereby to overbalance the 560 units of voltage produced by the scale potentiometer P1 and so produce by means of the amplifier A1 and the relay RL1 an operation of the switch means PQ. In order that the introduction of the resistance R34 shall not upset the equality of the ranges of the scale potentiometer P1 and the Kelvin-Varley potentiometer, a resistance R33 equal in value to the resistance R34 is connected to the high end of the scale potentiometer P1.

In order to produce a shift of the balance point in the second order balancing stage S2 of the Kelvin-Varley potentiometer by an amount equal to one unit increment in that stage so as to permit the balancing of the next lower order stage S3, the third and fourth contacts of the banks C and D serve to connect the resistances R35 and R36 to the low and high ends respectively of the Kelvin-Varley potentiometer. The resistances R35 and R36 respectively correspond with 10 units and 90 units so as to produce a bias of 10 units in the tens decade S2 of the Kelvin-Varley potentiometer. Thus when the tens decade of the Kelvin-Varley potentiometer reaches 60 units the Kelvin-Varley potentiometer together with the resistances R35 and R36 produce 70 units of counter voltage which overbalances the 60 units produced by the scale potentiometer P1 so as to secure an operation of the switch means PQ under the control of the relay RL1.

In a similar manner to that above described the resistances R37 and R38 corresponding to 1 unit and 99 units respectively are connected to the 5th and 6th contacts of the banks D and E so as to produce 1 unit bias or shift of the balance point in the lowest order decade S3 of the Kelvin-Varley potentiometer.

Subsequent to the operation of the stepping relay S1 of the hundreds decade and the resultant operation of the relay RL1 to engage the contact Q the 2nd contact of bank B is connected to the negative terminal of the D.C. supply whereby the moving contacts B, C, D and E are progressed to the 3rd contacts of their banks. At this position the resistance R34 has been disconnected and the pair of resistances R35 and R36 are introduced into the circuit so that the bridge passes from an over-balanced to an under-balanced condition to result in a phase reversal and the consequent operation of the relay RL1 to thereby engage the contact P. Since the contact B is connected to the negative terminal of the D.C. supply the moving contacts B, C, D and E are further traversed to engage the 4th contacts whereupon contact C4 is connected to the negative terminal of the D.C. supply to result in the stepping relay S2 being energized to effect the setting of the tens decade R12—R22. Subsequent to the adjustment of the tens decade from an under-balanced to an over-balanced position the consequent phase reversal results in the engagement of contact Q. In a similar manner to that previously described contacts B5 and B6 are sequentially engaged to effect the setting of the units decade R23—R32. The stepping relays S1, S2 and S3 are thus automatically set in accordance with the indication of the weighing apparatus and this setting may be used to provide a corresponding digital representation.

It will be appreciated that the above described arrangement ensures that the output from the potentiometer P1 is balanced to the nearest unit of 1 in 999 units irrespective of the gain of the amplifier and the sensitivity of the phase sensitive relay RL1 provided that the overall sensitivity is such that a signal of 0.1 unit or less will operate the relay RL1 in order that the arrangement is sensitive to a change between .4 and .5 unit.

In order to carry the present invention into effect further resistances RC and RD are connected in the bridge circuit as shown in the accompanying drawing, under the control of one pole S5A of a two-pole switch S5. Thus in the upper contact position of the switch S5A (as shown) the bridge circuit consists of the weight responsive potentiometer P1 forming on the two sides of its wiper two legs of the bridge, and the Kelvin-Varley potentiometer R1—R32 with selected members of the biasing resistances R34—R41 forming on opposite sides of its connection to the amplifier A1 the other two legs of the bridge, the potentiometers P2 and P3 and the resistor R33 merely serving for calibration and biasing resistance matching as above explained. In this switch position the resistor RC is short circuited and the resistor RD open circuited so that neither resistor is effective in the circuit. With the switch S5A in its lower contact position the bridge circuit is altered in that the resistor RD is introduced in parallel with the Kelvin-Varley potentiometer and the resistor RC is introduced in series with both the Kelvin-Varley potentiometer and the resistor RD. The magnitudes of the resistances RC and RD are chosen so that when the switch S5 is in the lower contact position the voltage present across the terminals of the Kelvin-Varley potentiometer is reduced by a predetermined proportion by the shunt resistance RD whereas the same impedance is presented to the terminals of the potentiometers P2 and P3 due to the presence of the series resistor RC making up the decrease in resistance of the K.V. potentiometer by the shunt resistance RD, as when the resistances RC and RD are short circuited and disconnected respectively from the circuit in the upper contact position of the switch pole S5A. Thus it will be appreciated that when the resistances RC and RD are disconnected and short circuited in the bridge circuit by operation of the switch S5A then the voltage which is applied across the Kelvin-Varley potentiometer will be increased by the predetermined proportion with the result that the circuit will again be balanced after an increased setting of the potentiometer P1 corresponding with the delivery of a further weight of material to the weighing mechanism.

In addition to controlling the connection of the resistances RC and RD into the bridge circuit the switch through its second pole S5B is also adapted to effect simultaneously the connection of the terminal Q either to the moving contact of the contact bank C and to the 7th contact of the contact bank B both of the governing relay S4 or to the energising coil of a relay RL4 in the circuit of a feed control mechanism which is adapted to govern the feed of a second weighment in addition to the first weighment.

In operation the switch poles S5A and S5B initially occupying their lower contact positions opposite to that seen in the accompanying drawing whereby a reduced voltage is applied to the Kelvin-Varley potentiometer by virtue of the presence of the shunt resistance RD, and whereby the contact Q has connection with the governing relay S4 in the normal manner. A commodity of unknown weight is then placed on the weighing mechanism and the self-balancing operation of the system is initiated to set the Kelvin-Varley potentiometer automatically to balance the setting of the weight responsive potentiometer P1 representing the magnitude of the weight of the first commodity. The switch poles S5A and S5B are now set in their alternative contact position, either manually or automatically by the use of relays, whereby the resistances RC and RD are removed and short circuited from the bridge circuit. Thus the voltage applied across the Kelvin-Varley potentiometer is increased by a desired proportion dependent on the value of the shunt resistance RD thereby to alter the ratio of resistances in the two legs containing the K.V. potentiometer, and the balance of the bridge circuit is upset. Further, the changeover of the switch pole S5B energises the relay RL4 to establish the feed of a second commodity to the first commodity on the weighing mechanism and this feed continues until the setting of the potentiometer P1 associated with the weighing mechanism again balances the setting of the Kelvin-Varley potentiometer and the resulting phase reversal of the signal supplied to the phase conscious circuit effects the alternate setting of the contacts P and Q controlled thereby. In this manner the circuit of the relay RL4 is automatically de-energised to arrest the feed of the second commodity after a predetermined proportion of the second commodity has been fed to the first commodity.

It will be appreciated that the above described system may be employed in many varied applications and by way of example the addition of brine to ham in predetermined proportion may be mentioned.

I claim:

1. In automatic weighing apparatus of the type having bridge circuit means for applying an energizing voltage of fixed magnitude to a first pair of opposite terminals of said bridge, a self-balancing potentiometer in one pair of legs of said bridge and a variable resistance circuit in an other pair of legs of said bridge adapted to be adjusted to cause balance of said bridge circuit with a selected combined weighment of two ingredients; means inserting auxiliary impedance in said bridge circuit for applying a reduced voltage across said potentiometer during the weighing operation of the first ingredient to thereby cause the potentiometer to set up a balanced condition at an indicated weighment corresponding to the proportion of the first ingredient to the total weighment, and a circuit including switching means removing said auxiliary impedance for applying full voltage across said potentiometer while presenting no change in impedance to said opposite terminals during the weighing operation of the second ingredient to thereby cause the potentiometer to indicate a balanced condition at the selected combined weighment.

2. In automatic weighing apparatus of the type having a bridge circuit, a variable resistance in one pair of legs of the bridge operable to be adjusted in accordance with the magnitude of a weighment and a self-balancing potentiometer circuit disposed in the other pair of legs of the bridge and being operable to automatically balance the bridge, ratio varying means for varying the resistance ratios set up in at least one of said pairs of legs to enable said potentiometer circuit to be set to balance a first setting of the variable resistance with one resistance ratio and to enable a second setting of said variable resistance in predetermined proportion to the first setting of said variable resistance to be balanced by said setting of the potentiometer circuit with a second resistance ratio setting, a feed control circuit for controlling the feed of a second material to a first material, and a circuit including switching means controlling said ratio varying means and said feed control circuit to cause said potentiometer circuit to first balance the setting of the variable resistance means according to the weight of the first material in a first ratio setting, said feed control circuit being operable with the second ratio setting to deliver the second material to the first material until the weight responsive variable resistance balances the potentiometer circuit setting giving a weighment of the second material in predetermined proportion to the weighment of the first material.

3. The apparatus as defined in claim 2 wherein said ratio varying means consists of shunt and series resistors rendered effective in one of said pairs of legs in one ratio setting and rendered ineffective in the other ratio setting.

References Cited in the file of this patent

UNITED STATES PATENTS

| | | |
|---|---|---|
| 2,630,007 | Howe | Mar. 3, 1953 |
| 2,708,368 | Kolisch | May 17, 1955 |
| 2,766,981 | Lauler | Oct. 16, 1956 |
| 2,927,784 | Lyons | Mar. 8, 1960 |
| 2,938,701 | Thorsson | May 31, 1960 |